US009321153B1

(12) United States Patent
Niblett et al.

(10) Patent No.: US 9,321,153 B1
(45) Date of Patent: Apr. 26, 2016

(54) WATER METER WRENCH RETAINER

(71) Applicants: Randy Niblett, Tulsa, OK (US); Natalie Niblett, Tulsa, OK (US)

(72) Inventors: Randy Niblett, Tulsa, OK (US); Natalie Niblett, Tulsa, OK (US)

( * ) Notice: Subject to any disclaimer, the term of this patent is extended or adjusted under 35 U.S.C. 154(b) by 0 days.

(21) Appl. No.: 14/601,314

(22) Filed: Jan. 21, 2015

(51) Int. Cl.
*B25B 13/48* (2006.01)
*F16M 13/02* (2006.01)
*A47L 13/512* (2006.01)

(52) U.S. Cl.
CPC ............... *B25B 13/48* (2013.01); *A47L 13/512* (2013.01); *F16M 13/022* (2013.01)

(58) Field of Classification Search
CPC ...... B25B 13/48; F16M 13/02; F16M 13/022; A47L 13/512
USPC .............. 248/317, 328, 682, 693, 227.4, 340; 211/66, 70.6
See application file for complete search history.

(56) References Cited

U.S. PATENT DOCUMENTS 831,391 A * 9/1906 Ubellar ................. A47F 5/0006 15/246
1,318,567 A * 10/1919 Key .......................... A45F 3/00 248/693
2,673,705 A * 3/1954 Buckley .................. B60R 11/04 224/311
3,042,355 A * 7/1962 Stevens ............... A61M 5/1415 248/214
4,095,362 A * 6/1978 Potter ..................... B42F 15/00 248/317
4,141,452 A * 2/1979 Martin .................. A47L 13/512 211/66
4,546,679 A 10/1985 Burghardt
4,794,827 A * 1/1989 Poling ..................... B25B 13/28 81/125
D347,982 S 6/1994 Perez
5,353,651 A 10/1994 Pate
6,612,530 B1 * 9/2003 Kwak ...................... A47K 5/04 211/113
7,000,897 B2 2/2006 Chick
RE42,568 E * 7/2011 Artemi ............... A47G 25/1442 211/113
2009/0256044 A1 * 10/2009 Miller ...................... G21F 3/02 248/317

* cited by examiner

*Primary Examiner* — Anita M King
(74) *Attorney, Agent, or Firm* — Dennis D. Brown; Brown Patent Law, PLLC

(57) ABSTRACT

A water meter wrench retainer that removably attaches to a water meter lid of a water meter can. The retainer has an elongated bar attached centrally to one end of a flexible member. An opposite end of the flexible member secures to a water meter wrench. When the retainer is attached to the lid, the bar is on top of the lid, the flexible member extends through an opening in the lid and the wrench hangs downward within the can. The bar is sized so that it can be inserted through the can opening as a way of securing the retainer to and removing it from the lid. One end of the bar is flattened to scrape mud and dirt from the meter. The flattened end aids a user in grasping the bar which allows the bar to serve as a handle to remove the lid from the can.

6 Claims, 2 Drawing Sheets

WATER METER WRENCH RETAINER

BACKGROUND OF THE INVENTION

1. Field of the Invention

The present invention is a retainer that attaches to a water meter can lid and is designed for holding and storing a water meter wrench within the water meter can where it will be readily available to operate the water meter cut off valve in the event that a water leak makes it necessary to quickly cut off flow of water through the water meter. The retainer can also be used as a handle for removing the water meter can lid from the water meter can.

2. Description of the Related Art

Currently water meters are not supplied with a tool for operating the water meter cut off valve contained within a water meter can. In an emergency situation such as when a water leak occurs within a home, the home owner must first find a water meter lid key to remove the lid from the water meter can and then locate a suitable wrench for operating the water meter cut off valve located within the water meter can before the valve can be turned to stop the flow of water. Often it takes some time to locate suitable tools for removing the water meter can lid and for turning the water meter cut off valve. During the time the homeowner is searching for the necessary tools, the water continues to flow into the house resulting in unnecessary water damage within the home.

The present invention addresses this need with a water meter wrench retainer. The retainer serves as a means of removing the water meter can lid from the water meter can without the need for a water meter lid key and serves to store a water meter wrench within the water meter can so that the wrench is immediately available at the water meter to operate the meter's water cut off valve.

The retainer has a water meter wrench that is attached centrally to a handle via a flexible chain or cable. The retainer removably secures to the water meter can lid through an opening provided in the lid. When in use, the handle is held on the top of the lid and parallel with the top, the attached flexible chain or cable extends through the opening in the lid, and the attached wrench hangs downward within the water meter can.

The retainer can be used as a handle to remove the lid from the water meter can simply by lifting upward on the handle. Because the wrench is larger than the opening in the lid, when the wrench engages the bottom of the lid, additional upward force on the handle with raise the lid off of the water meter can so that the lid can be removed from the can.

Once the lid has been removed from the can, the retainer is then removed from the lid. The handle of the retainer is an elongated bar that is preferably flattened on one end. In order to remove the retainer from the lid, the handle is first oriented parallel with the flexible chain or cable and then it can be slipped through the opening in the lid to disengage the retainer from the lid. Once the retainer is disengaged from the lid, the flattened end of the wrench can be used to scrape mud or dirt from the valve if necessary, and then the attached wrench is available to operate the water meter valve.

The retainer allows the user to quickly remove the lid from the water meter can, disengage the retainer from the lid, and use the attached wrench to turn off the water valve. Having a wrench readily available at the location where it is needed in an emergency saves valuable time and lessens the amount of water that flows into the house and causes damage.

When the retainer is in use holding the wrench, only the small, elongated bar of the retainer is located above the lid and gravity and weight of the wrench pulling downward on the bar causes the bar to lay flat against the top of the can lid so that it does not create a tripping hazard and does not interfere with lawn mowers and other types of equipment that may run over the water meter can lid.

SUMMARY OF THE INVENTION

The present invention is a water meter wrench retainer that attaches to the lid that covers the water meter can. The retainer has an elongated bar that is preferably flattened on one end and that is attached centrally to a first end of a flexible chain or cable. An opposite second end of the flexible chain or cable is secured to a water meter wrench.

The elongated bar is of a size that, when held parallel with its attached flexible chain or cable, allows the bar to be pass through a lid opening provided in the lid of a water meter can.

When secured to the water meter lid, the bar is turned 90 degrees so that the bar is parallel with the top of the water meter can lid, the attached flexible chain or cable extends through the lid opening and the attached water meter wrench provided on the second end of the flexible chain or cable hangs from the lid downward within the water meter can when the lid is resting on the top of water meter can.

The water meter wrench is larger in diameter than the lid opening so that when the user lifts upward on the bar, the bar serves as a handle for removing the lid from the can. As the bar is lifted, the wrench engages the bottom of the lid and the lid is lifted upward so that it can be removed from the can.

To quickly disengage the retainer from the lid so that the wrench can be used to operate the water meter cut off valve, the bar is turned so that it is parallel with the flexible chain or cable and then can be slipped downward through the lid opening. The bar's flattened end can be used to scrap mud or dirt from the valve if necessary. Having a wrench readily available at the location where it is needed in an emergency saves valuable time and lessens the amount of water that flows into the house and causes damage.

When the retainer is in use holding the wrench within the water meter can, only the elongated bar of the retainer is located above the lid and the weight of the wrench pulling on the bar causes the bar to lie flat against the top of the can lid so that it does not create a tripping hazard and does not interfere with lawn mowers and other types of equipment that may run over the water meter can lid.

DETAILED DESCRIPTION OF THE PREFERRED EMBODIMENT

Figure 1:
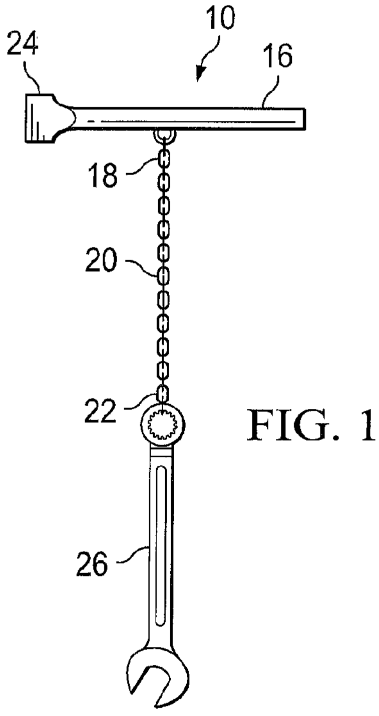
FIG. 1 is a side view of a water meter wrench retainer that is constructed in accordance with a preferred embodiment of the present invention.
Figure 2:
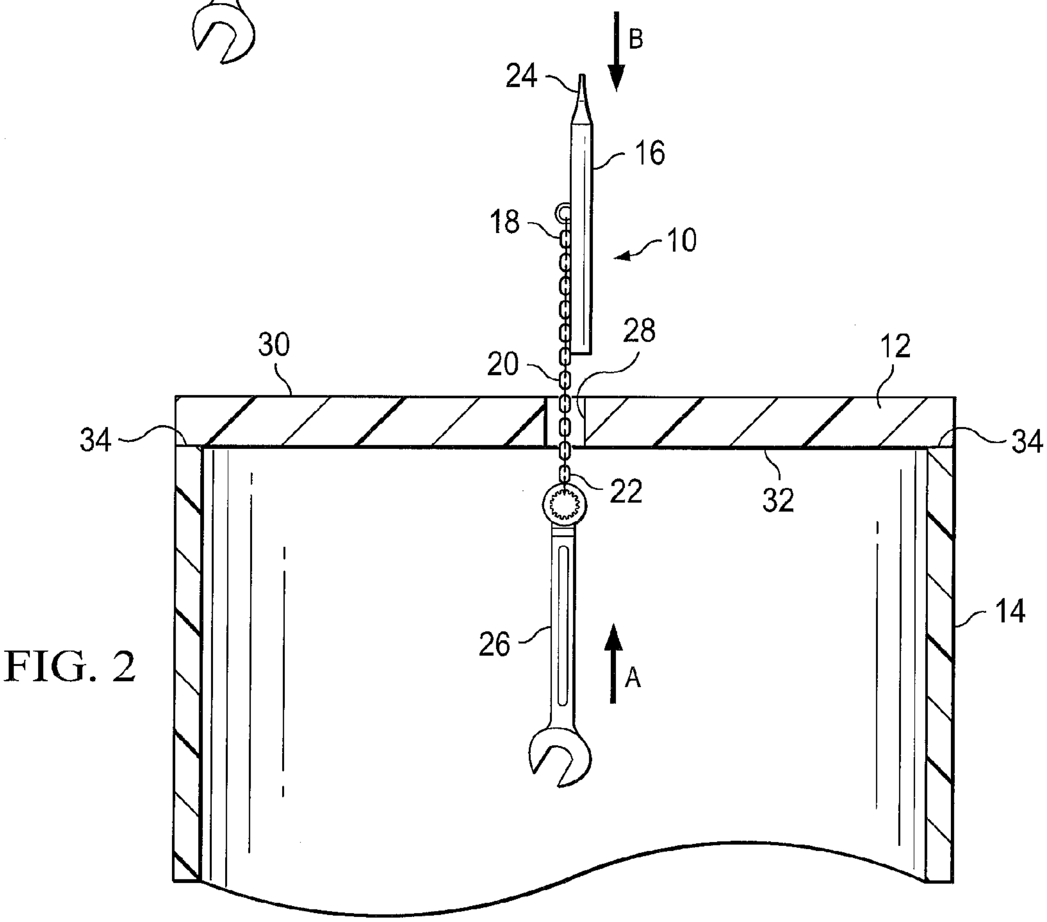
FIG. 2 is a side view of the water meter wrench retainer of FIG. 1 shown positioned so that it can be inserted through a lid opening provided in a water meter can lid.
Figure 3:
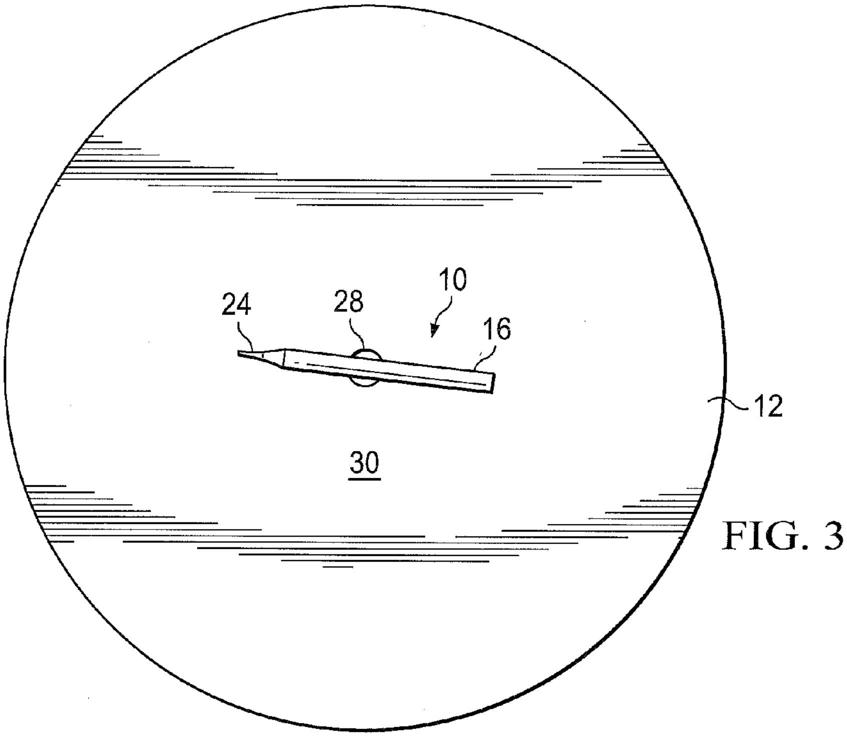
FIG. 3 is a top plan view of the water meter wrench retainer of FIGS. 1 and 2 shown in its storage position on the water meter can lid.
Figure 4:
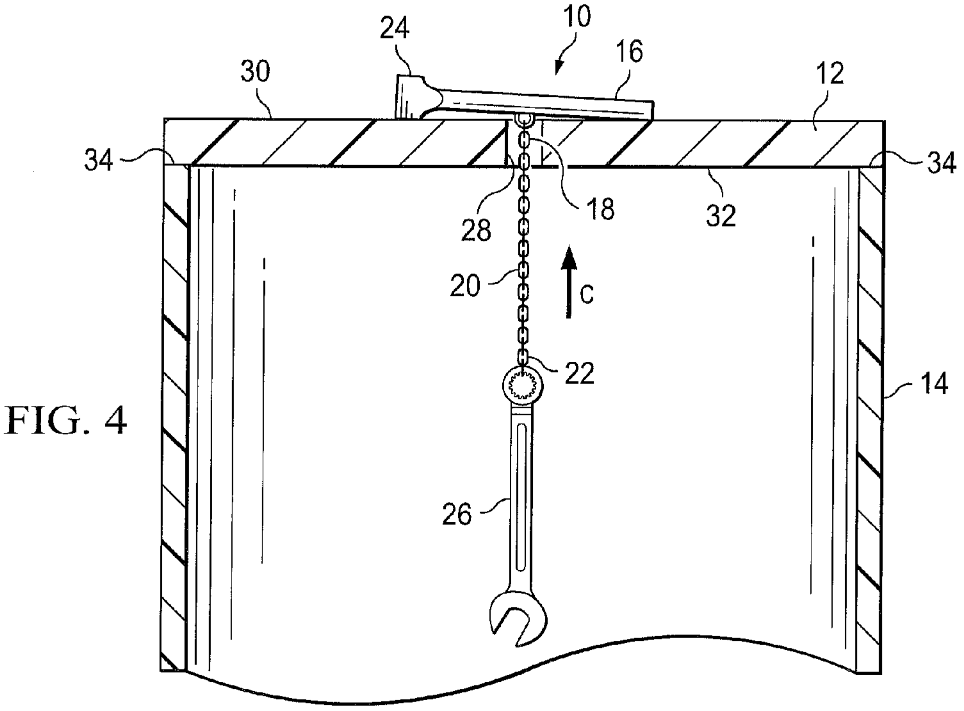
FIG. 4 is a side view of the water meter can, the water meter can lid and the attached water meter wrench retainer of FIG. 3.

Referring now to the drawings and initially to FIG. 1, there is illustrated a water meter wrench retainer 10 that is constructed in accordance with a preferred embodiment of the present invention. As shown in FIGS. 2-4, the retainer 10 attaches to a water meter can lid 12 that covers a water meter can 14. A water meter (not illustrated) is generally located within the water meter can 14 which is buried in the ground.

The retainer 10 includes a cylindrical elongated bar 16 that will serve as a handle for removing the lid 12 from the water meter can 14. The bar 16 is attached centrally to a first end 18 of a flexible chain or cable 20. One end of the bar 16 is provided with a flattened edge 24 that can be used to remove mud or dirt from the meter, as needed, when the retainer is removed from the lid.

An opposite second end 22 of the flexible chain or cable 20 is secured to a water meter wrench 26 that is a standard water meter valve measurement so that it can turn or operate the water meter valve provided on the water meter that is located within the water meter can 14.

Referring now to FIG. 2, the bar 16 is of a size that, when held parallel with its attached flexible chain or cable 20, allows the bar 16 to be inserted through a lid opening 28 provided in the lid 12 of a water meter can 14. This is shown by Arrow A in FIG. 2. Once inserted through the lid opening 28, the bar 16 is turned 90 degrees so that the bar 16 is parallel with a top 30 of the water meter can lid 12, as shown in FIGS. 3 and 4. This is the storage position for the retainer 10 with the bar 16 laying parallel with the top of the lid, the flexible chain or cable 20 extending through the lid opening 28 and the wrench 26 hanging downward from the lid 12 within the water meter can 14 when the lid 12 is resting on the top 30 of the water meter can 14.

In order to remove the lid 12 from the water meter can 14, the user will grasp the bar 16 and pull upward on it. The flattened edge 24 of the bar 16 is oriented parallel with said flexible chain or cable 20 when the retainer 10 is in its storage position. This makes the bar 16 easier for the user to get a grip on the bar 16. The water meter wrench 26 is larger in diameter than the lid opening 28 so that when the user lifts upward on the bar 16, the bar 16 serves as a handle for removing the lid 12 from the can 14. As the bar 16 is lifted, the wrench 26 engages the bottom 32 of the lid 12 and the lid 12 is lifted upward with the retainer 10 so that the lid 12 can be removed from the can 14.

Once the lid 12 has been removed from the can 14, the retainer 10 is then removed from the lid 12 by once again turning the bar 16 to the position shown in FIG. 2 and the bar 16 is slipped through the lid opening 28 as shown by Arrow B in FIG. 2.

Once the retainer 10 has been removed from the lid 12, the wrench 26 is readily available to be used to operate a water meter valve (not illustrated) provided on the water meter (not illustrated). Having a wrench 26 readily available at the location where it is needed in an emergency saves valuable time and lessens the amount of water that flows into a house and causes damage.

When the user is ready to replace the lid 12 on the can 14, the retainer 10 is first reinstalled on the lid 12 and then the bar 16 is grasped and pulled upward to lift the lid 12 back onto the can 14. This pulls the wrench 26 away from the top edge 34 of the can 12 so that the wrench 26 is held within the can 12 and does not interfere with placement of the lid 12 onto the can 14. Once the lid 12 has been replaced on the can 14, the bar 16 is released by the user and the weight of the wrench 26 pulling downward pulls the bar 16 back into its storage position parallel with the top 30 of the lid 12, as shown in FIGS. 3 and 4.

When the retainer 10 is in its storage position shown in FIGS. 3 and 4, only the elongated bar 16 of the retainer 10 is located above the lid 12. The combined weight of the wrench 26 and the flexible chain or cable 20 pulling downward on the bar 16 causes the bar 16 to lie flat against the top 30 of the can lid 12 so that it does not create a tripping hazard and does not interfere with lawn mowers and other types of equipment that may run over the water meter can lid 12.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A water meter wrench retainer apparatus comprising:
- a water meter can lid having an opening provided therethrough;
- a bar,
- a water meter wrench,
- a first end of a flexible member attached centrally to said bar,
- an opposite second end of the flexible member secured to said water meter wrench,
- the flexible member extending through the opening of the water meter can lid such that said bar is positioned on or above a top side of the water meter can lid and said water meter wrench is positioned below a bottom side of the water meter can lid,
- said bar having a cross-sectional size smaller than the opening of the water meter can lid such that said bar can be oriented for delivering said bar through the opening, and
- said water meter wrench having a cross-sectional dimension larger than the opening of the water meter can lid such that said water meter wrench cannot be delivered through the opening.

2. A water meter wrench retainer apparatus according to claim 1 wherein said flexible member is a chain.

3. A water meter wrench retainer apparatus according to claim 1 wherein said flexible member is a cable.

4. A water meter wrench retainer apparatus according to claim 1 wherein said bar is elongated.

5. A water meter wrench retainer apparatus according to claim 1 further comprising a flattened edge provided on one end of said bar.

6. A water meter wrench retainer apparatus according to claim 5 wherein said flattened edge is oriented parallel with said flexible member when in a storage position.

* * * * *